No. 650,315. Patented May 22, 1900.
H. R. HAMER.
VEHICLE AXLE NUT.
(Application filed Dec. 18, 1899.)
(No Model.)
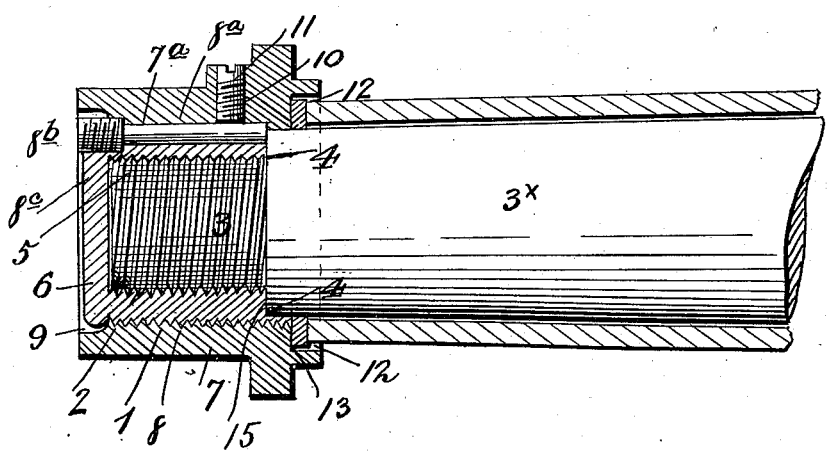
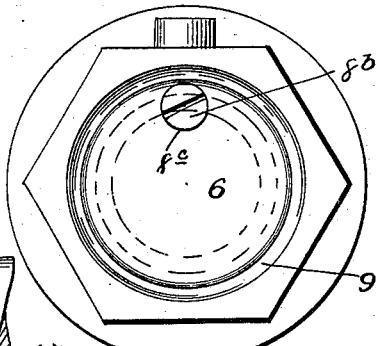
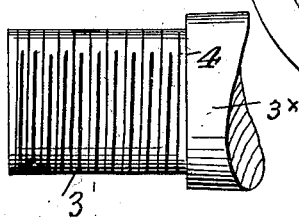
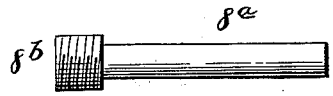
Witnesses.
F. L. Ourand
E. P. Bunyen
Inventor:
Harry R. Hamer
By Louis Baggar & Co.
Attorneys.

UNITED STATES PATENT OFFICE.

HARRY R. HAMER, OF NORTH ADAMS, MASSACHUSETTS.

VEHICLE-AXLE NUT.

SPECIFICATION forming part of Letters Patent No. 650,315, dated May 22, 1900.

Application filed December 18, 1899. Serial No. 740,786. (No model.)

*To all whom it may concern:*

Be it known that I, HARRY R. HAMER, a citizen of the United States, residing at North Adams, in the county of Berkshire and State of Massachusetts, have invented new and useful Improvements in Vehicle-Axle Nuts, of which the following is a specification.

My invention relates to vehicle-axle nuts; and one object of the same is to provide simple and efficient means for taking up the wear of the parts as they become worn and to provide a device which may be adjusted without separation of the parts.

Another object is to provide means for holding the axle-nut from accidental detachment at whatever point of adjustment the parts may have assumed.

I attain these objects by means of the construction shown in the accompanying drawings, which form a part of this specification, and in which—

Figure 1 is a sectional view taken through the axle and hub longitudinally thereof. Fig. 2 is an end view of the axle and nut. Fig. 3 is a side view of the key. Fig. 4 is a front elevation of the nut. Fig. 5 is a rear elevation of the bushing. Fig. 6 is a detail view of the threaded end of the axle.

Like numerals of reference designate like parts wherever they occur in the different views.

In carrying my invention into effect I make use of a bushing 1, having a screw-threaded interior socket 2, designed to fit the threaded end 3 of the axle $3^\times$ and to set closely up against the shoulder 4, formed on said axle. The outer surface of the bushing 1 is threaded and is provided with a longitudinal groove 5, extending from end to end of said threaded surface, and at the outer end of the bushing a bead or enlargement 6 is formed.

The nut or shell 7 has a threaded bore 8 extending nearly from end to end of the nut, and this bore is adapted to fit the thread upon the outer surface of the bushing 1. The bore 8 is somewhat larger in diameter than the smooth portion of the axle to allow it to pass over said smooth portion in order to meet the different conditions of wear of the box. A groove $7^a$ extends from end to end of the threaded bore 8 in said nut, and this groove conforms in size and extent to the groove 5 in the bushing. When these two grooves are brought into register, a key or pin $8^a$ is inserted in the circular aperture formed by the two grooves 5 and $7^a$. The key or pin $8^a$ has a threaded head portion $8^b$, which fits into a small threaded socket $8^c$ at the outer end of the circular hole formed by the grooves in said bushing and nut or shell. A recess 9 in the outer end of the nut 7 forms a seat for the bead or enlargement 6 on the bushing. At any suitable point the nut 7 is provided with a screw-threaded aperture 10, which extends entirely through one wall of said nut and communicates with the groove $7^a$.

A set-screw 11 is threaded to fit the aperture 10 and is designed to bear on the key or pin $8^a$ to hold the nut or shell at any point of adjustment within the limit of the groove to meet the varying conditions of wear.

The inner end of the nut is provided with a recess 12 for a washer placed in said recess between its inner face 13 and the box of the hub to form a bearing for the box.

In assembling the parts the nut or shell 7 is placed over the end of the axle, and the bushing 1 is then screwed into the bore 8 of said nut and turned upon the spindle of the axle until its inner end 15 bears against the shoulder 4 on the axle. In this condition the nut or shell 7 may be adjusted to any point by screwing said nut or shell along the threaded surface of the bushing until it shall extend over the smooth part of the axle so far as is necessary to take up the wear of the box by turning said nut upon the bushing until the grooves register and then the key $8^a$ is inserted. The set-screw 11 may then be turned down to bear against the key to hold the parts in relative adjustment.

It will be noted that owing to the bead 6 on the bushing the nut 7 cannot slip off and be lost, even when the set-screw 11 may become loose.

For some classes of vehicles the bushing may have a smooth or unthreaded outer surface and the key and set-screw would hold the parts reliably in place. It is also to be noted that some of the advantages of my invention may be derived by omitting the set-screw and relying upon the key to hold the parts in place when adjusted.

My invention is extremely simple and inexpensive to manufacture and may be readily applied to either new or old vehicle-axles.

Having thus fully described my invention, what I claim is—

1. A vehicle-axle nut comprising a bushing interiorly screw-threaded to fit the axle-spindle, and provided with a longitudinal groove in its outer surface, said bushing being in the form of a cap-nut, in combination with a nut or shell having a threaded bore to fit the bushing, a groove in the bore, and a key fitting the grooves in the bushing and shell or nut, the outer end of said key being threaded to screw into a threaded socket in the enlargement on the bushing to hold the nut and bushing in relative adjustment, substantially as described.

2. A vehicle-axle nut consisting of a bushing having an interiorly-screw-threaded socket to fit the threaded end of an axle-spindle, a threaded exterior surface, a groove from end to end of said surface, and a bead at its outer end, in combination with a nut or shell having a threaded bore to fit over said bushing and an unthreaded portion which extends over the smooth portion of the axle, a groove in the bore and a key fitting said grooves to hold the bushing and nut in relative adjustment, and a recess at the outer end of the nut for the bead on the end of the bushing, substantially as described.

3. A vehicle-axle nut consisting of a cap-bushing having an interiorly-threaded socket to fit the threaded end of an axle-spindle, a groove on the outer surface of said bushing, a nut or shell having a corresponding groove, a key fitting the registering grooves, the outer end of said key being threaded to screw into a threaded socket in the enlargement on the bushing, to hold the key in place, substantially as described.

In testimony whereof I have hereunto set my hand in presence of two subscribing witnesses.

HARRY R. HAMER.

Witnesses:
CHAS. W. FORD,
CORNELIUS A. PARKER.